(12) United States Patent
K et al.

(10) Patent No.: US 10,229,440 B2
(45) Date of Patent: Mar. 12, 2019

(54) ACCELERATED PRICE CALCULATION USING IN-MEMORY TECHNOLOGY

(71) Applicant: SAP SE, Walldorf (DE)

(72) Inventors: Prajesh K, Mattanur (IN); Baris Yalcin, Muhlhausen (DE)

(73) Assignee: SAP SE, Walldorf (DE)

( * ) Notice: Subject to any disclaimer, the term of this patent is extended or adjusted under 35 U.S.C. 154(b) by 1197 days.

(21) Appl. No.: 14/320,385

(22) Filed: Jun. 30, 2014

(65) Prior Publication Data

US 2015/0379593 A1 Dec. 31, 2015

(51) Int. Cl.
*G06Q 30/02* (2012.01)

(52) U.S. Cl.
CPC ..... *G06Q 30/0283* (2013.01); *G06Q 30/0206* (2013.01)

(58) Field of Classification Search
CPC ............... G06Q 30/0283; G06Q 30/02; G06Q 30/0206; G06Q 30/06; G06Q 30/00
USPC .................................................. 705/7.35, 400
See application file for complete search history.

(56) References Cited

U.S. PATENT DOCUMENTS

| | | | |
|---|---|---|---|
| 5,873,069 A | 2/1999 | Reuhl et al. | |
| 6,823,320 B1 * | 11/2004 | Rubin | G06Q 30/08 705/400 |
| 7,343,325 B2 | 3/2008 | Shaver et al. | |
| 7,383,990 B2 | 6/2008 | Veit | |
| 7,596,512 B1 * | 9/2009 | Raines | G06Q 30/02 705/26.4 |
| 7,711,676 B2 | 5/2010 | Stuhec | |
| 7,761,313 B1 * | 7/2010 | Brown | G06Q 30/02 705/4 |
| 7,805,383 B2 | 9/2010 | Veit et al. | |
| 8,554,637 B2 | 10/2013 | Becker et al. | |
| 8,595,079 B1 * | 11/2013 | Raines | G06Q 30/0201 705/26.1 |
| 8,600,955 B2 | 12/2013 | Werner | |
| 9,811,845 B2 * | 11/2017 | K | G06Q 30/0283 |
| 2003/0200185 A1 | 10/2003 | Huerta et al. | |
| 2007/0299749 A1 | 12/2007 | Lovell, Jr. et al. | |

(Continued)

FOREIGN PATENT DOCUMENTS

JP 2012113517 A * 6/2012
WO 200135293 A1 5/2001

OTHER PUBLICATIONS

Arnold,Arne and Brenckman, Ingo, "EIM201 Architecture and Technology in SAP HANA", 2012, 52 pages.*

(Continued)

*Primary Examiner* — Brian M Epstein
*Assistant Examiner* — Freda A Nelson
(74) *Attorney, Agent, or Firm* — Klarquist Sparkman, LLP

(57) ABSTRACT

A price calculator may receive a pricing request for at least one item, the at least one item priced in accordance with a pricing schema including a plurality of price components. The price calculator may include a parallel price calculator configured to retrieve a parallel calculation flow handling procedure corresponding to the at least one item and designating at least two price subcomponents common to the price components. The price calculator may then calculate the at least two price subcomponents for the price components in parallel, using the parallel calculation flow handling procedure.

14 Claims, 5 Drawing Sheets

(56) References Cited

U.S. PATENT DOCUMENTS

2009/0063251 A1* 3/2009 Rangarajan ...... G06Q 10/06375
705/7.31
2010/0082497 A1 4/2010 Biesemann et al.
2012/0036089 A1* 2/2012 Washington ........... G06Q 10/10
705/400
2013/0124264 A1 5/2013 Raman et al.

OTHER PUBLICATIONS

Saboo, Manta; "Pricing in CRM using IPC", Apr. 26, 2013, blogs.sap.com; 28 pages.*
Arnold, Arne and Brenckman, Ingo, "EIM201 Architecture and Technology in SAP HANA", 2012, 52 pages (Year: 2012).*
Saboo, Manta; "Pricing in CRM using IPC", Apr. 26, 2013, blogs.sap.com; 28 pages (Year: 2013).*
"Costing Methods in SAP Business One: An Overview—Part 1," retrieved from: http://it.toolbox.com/blogs/sap-library/costing-methods-in-sap-business-one-an-overview-part-1-9864, Jun. 13, 2006, 7 pages.
"Price Calculator," retrieved from: http://help.sap.com/saphelp_bankanalyzer50/helpdata/en/2e/f468589733c144a1e928efb918f04e/content.htm, downloaded on Jun. 30, 2014, 3 pages.
"Pricing," Posted by Eddie Mogilevsky, SAP SD Certified Consultant, downloaded on Jun. 30, 2014, 15 pages.
"SAP SD Pricing Fundamentals," retrieved from: http://www.magnatraining.com/sap-sd-pricing-fundamentals/, downloaded on Jun. 30, 2014, 16 pages.

* cited by examiner

ACCELERATED PRICE CALCULATION USING IN-MEMORY TECHNOLOGY

TECHNICAL FIELD

This description relates to price calculation techniques.

BACKGROUND

In order to sell goods or services, a business must set prices for those goods or services. Ideally, a price may be selected that maximizes profit (for a particular item or for a group of items as a whole), while ensuring competitive pricing with respect to the same or similar goods or services that may be available elsewhere.

However, many factors may need to be considered when setting a price. For example, a final price may reflect relevant taxes or surcharges, as well as volume discounts or other applicable price reductions. Moreover, price may be set based on, e.g., weight, quantity, volume, or other physical characteristics. In some cases, a price for one item may be set relatively lower, in order to entice additional sales of a related, higher priced item.

Further, prices may change dynamically based on external related factors, such as a current time or purchase context. For example, a price of an item for sale may vary with respect to a time of the year, recent sales volume of the item in question (e.g., such as when a price for a popular item is raised, or when a price for a less popular item is lowered), or based on a current sale or promotional event.

Consequently, when dealing with large numbers of price calculations, the price calculations may require an amount of processing time that is impractical or unacceptable. As a result, for example, a customer may experience frustration and inconvenience when waiting to receive a current price quote. Similarly, a sales representative may experience loss of sales as a result of such customer inconvenience. Consequently, a business may experience reduction in profits, as well as harm to a reputation of the business.

SUMMARY

In various non-limiting, example embodiments, price calculations are performed which conform to corresponding pricing schemas and which calculate certain price subcomponents that are common to a plurality of price components in parallel, and then execute remaining price subcomponents in series to determine a final value for the price components, and for a total price determined therefrom. In this way, prices may be calculated rapidly, and customers, wholesalers, salespersons, and other interested parties may receive current, updated prices in a fast and efficient manner, even for large quantities of prices being calculated.

According to one general aspect, a system includes instructions recorded on a non-transitory computer-readable storage medium, and executable by at least one processor. The system includes a price calculator configured to cause the at least one processor to receive a pricing request for at least one item, the at least one item priced in accordance with a pricing schema including a plurality of price components. The price calculator includes a parallel price calculator configured to cause the at least one processor to retrieve a parallel calculation flow handling procedure corresponding to the at least one item and designating at least two price subcomponents common to the price components. The parallel price calculator is further configured to cause the at least one processor to calculate the at least two price subcomponents for the price components in parallel, using the parallel calculation flow handling procedure.

According to another general aspect, a computer-implemented method for executing instructions stored on a non-transitory computer readable storage medium may include constructing, using design time tools of an application server, a parallel calculation flow handling procedure corresponding to at least one item priced in accordance with a pricing schema, the pricing schema specifying a plurality of price components, wherein the parallel calculation flow handling procedure calculates at least two price subcomponents common to the price components in parallel. The method may further include storing the parallel calculation flow handling procedure in a process repository of an in-memory computing engine, selecting, using runtime tools of the application server and in response to a pricing request for the at least one item, the parallel calculation flow handling procedure, and instructing the in-memory computing engine to calculate the plurality of price components using the parallel calculation flow handling procedure, including the calculating of the at least two price subcomponents common to the price components in parallel, using at least two processing cores of the in-memory computing engine.

A computer program product may be tangibly embodied on a non-transitory computer-readable storage medium and may include instructions that, when executed, are configured to cause at least one computing device to receive a pricing request for at least one item, the at least one item priced in accordance with a pricing schema including a plurality of price components. The instructions, when executed, may be further configured to cause the at least one computing device to retrieve a parallel calculation flow handling procedure corresponding to the at least one item and designating at least two price subcomponents common to the price components, and calculate the at least two price subcomponents for the price components in parallel, using the parallel calculation flow handling procedure.

The details of one or more implementations are set forth in the accompanying drawings and the description below. Other features will be apparent from the description and drawings, and from the claims.

DETAILED DESCRIPTION

Figure 1:
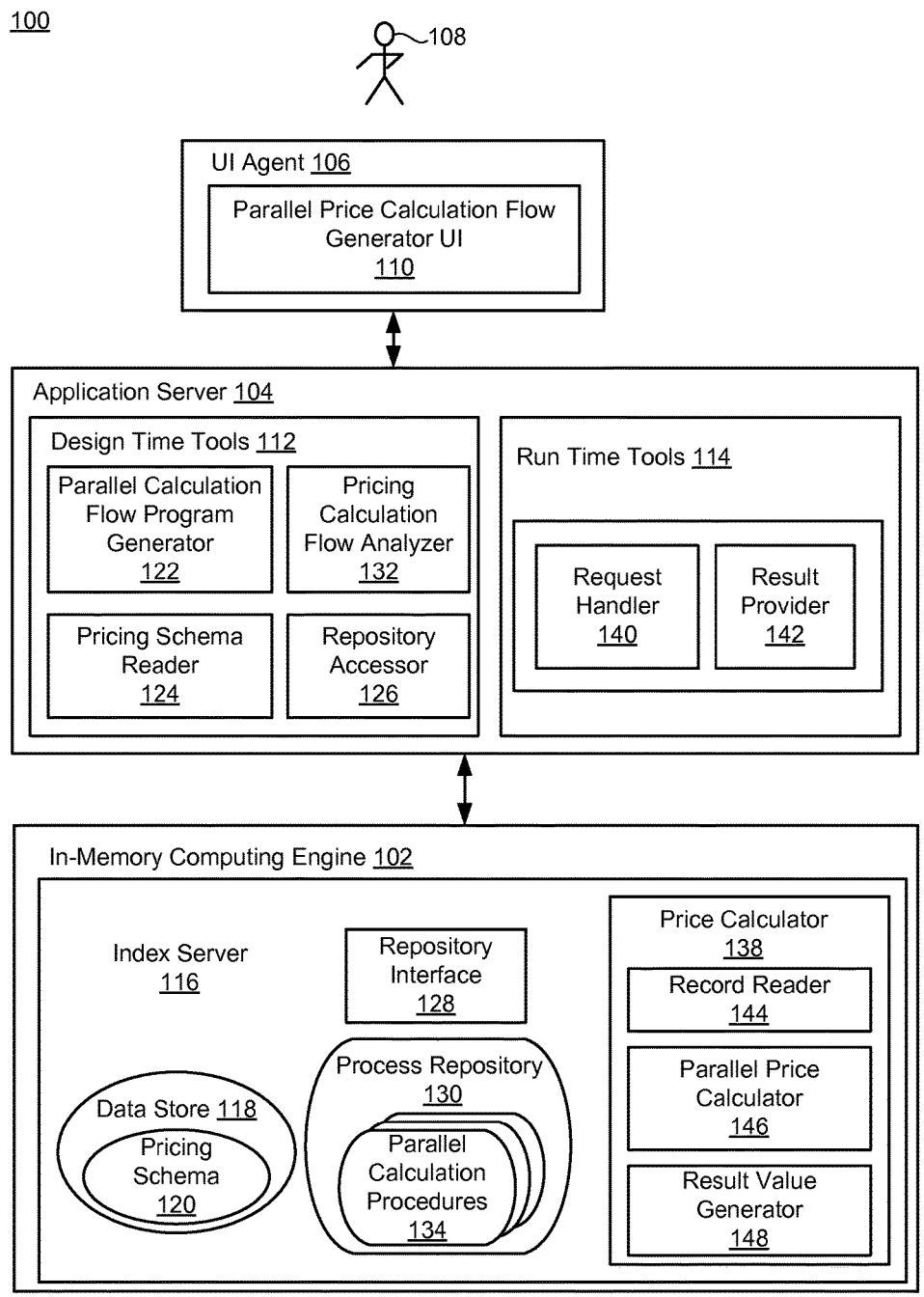
FIG. 1 is a block diagram of a system for accelerated price calculation using in-memory technology.

FIG. 1 is a block diagram of a system 100 for accelerated price calculation using in-memory technology. As described below, the system 100 of FIG. 1 may be used to enable fast, accurate pricing calculations, even in pricing scenarios involving a large volume of prices, complicated pricing techniques, or rapid, dynamic price changes.

In the example of FIG. 1, an in-memory computing engine 102 is illustrated as being in communications within a application server 104, which is itself operated through the use of a user interface (UI) agent 106 by user 108. For example, the user 108 may represent an administrator or other authorized user of the system 100, who is authorized to utilize a parallel price calculation flow generator UI 110 of the UI agent 106, in order to interact with the application server 104 and leverage the storage and processing capabilities of the in-memory computing engine 102 to implement fast, flexible, accurate price calculations.

In more detail, the in-memory computing engine 102 may generally represent any available current or future in-memory platform, in which data is stored for processing using a local main memory. Through the use of fast, local access to relatively large quantities of main memory, in conjunction with parallel processing resources, as described in detail below, the in-memory computing engine 102 is capable of providing the type of accelerated, dynamic, and accurate price calculation referenced above. In specific example implementations, the in-memory computing engine 102 may be implemented using the SAP HANA in-memory computing platform. However, again, it may be appreciated that any suitable, current or future in-memory computing platform may be utilized. In this regard, although many various features and functions of the in-memory computing engine 102 of FIG. 1 are provided in detail below, it will be appreciated that specific implementations of in-memory computing engines may include various other features and functions, which are not necessarily described herein, for the sake of simplicity and conciseness.

Meanwhile, the applications server 104 represents a hardware and/or software framework designed to ensure execution of application-related programs, routines, scripts, or other procedures by the in-memory computing engine 102, and in conjunction with the parallel price calculation flow generator UI 110. More specifically, as shown, the application server 104 includes design time tools 112 and runtime tools 114.

As described in detail below, the design tools 112 generally refer to tools used by the administrator 108, by way of the parallel price calculation flow generator UI 110, for configuring subsequent, runtime operations of the in-memory computing engine 102. In specific example implementations, the design tools 112 may be used to define a manner in which price calculations will occur (e.g., which portions of the price calculations will be performed in parallel), and to provide customized runtime artifacts for storage by the in-memory computing engine 102, for availability thereof during later runtime operations by the runtime tools 114. Thus, by virtue of such operations of the design time tools 112, the runtime tools 114 are provided with customized, ready-made price calculation solutions, which may be easily and immediately implemented with respect to a currently requested price calculation.

In more detail, the design time tools 112 may be used to interact with an index server 116 of the in-memory computing engine 102. The index server 116 may be understood to provide a variety of features and functions, only some of which are described in detail below, as may be necessary or helpful in understanding operations of the system 100. For example, the index server 116 may be configured to provide connection and session control with respect to communications with the application server 104, as well as operations related to authentication or other authorizations requested by or through the applications server 104. As shown and described, the index server 116 also may be configured to store, access, manipulate, and otherwise manage data used by the in-memory computing engine 102, along with any transaction management functions required to support such operations.

In the example of FIG. 1, the index server 116 includes a data store 118, which itself is used to store a pricing schema 120. Generally speaking, the pricing schema 120 may refer to a set of constraints, requirements, guidelines, algorithms, or other rules or criteria for determining a price or price component for a particular item or class of items for sale. For example, the pricing schema 120 may take into account whether an item or type of item is priced according to weight, count, age, quality, volume, or other characteristic, along with consideration of applicable taxes, fees, or surcharges, any seasonal or otherwise time-related price component, and many other types of pricing considerations, all combined in a manner designed to allow calculation of a current price of the related item or type of item. In practice, the pricing schema 120 may be considered to represent, or include, customized settings which reflect pricing strategies of an enterprise at various business transaction levels.

As shown, the design time tools 112 may include a parallel calculation flow program generator 122, which may be provided with a particular pricing schema for a corresponding item or type of item by way of a pricing schema reader 124. The pricing schema reader 124 may be configured to access the pricing schema 120 within the in-memory computing engine 102. The parallel calculation flow program generator 122 may be further configured to interact with a repository accessor 126, which itself communicates with a repository interface 128 of the index server 116, in order to thereby utilize a process repository 130. Then, in operation, the parallel calculation flow program generator 122 may utilize a pricing calculation flow analyzer 132 to analyze the obtained pricing schema, and thereby obtain one or more corresponding parallel calculation procedures 134, which, as shown, may be stored within the process repository 130 through the interactions of the repository accessor 126 and the repository interface 128.

Put another way, the parallel calculation flow program generator 122 serves as a manager to the remaining modules 124, 126, 132 of the design time tools 112. That is, as just described, the parallel calculation flow program generator 122 obtains a requested pricing schema from the pricing schema 120, by way of the pricing schema reader 124, and delegates calculation of a corresponding logic flow for parallel calculation procedures to the pricing calculation flow analyzer 132. The parallel calculation flow program generator 122 then assigns the repository accessor 126 with the task of storing the thus-calculated parallel calculation procedures 134 within the process repository 130 of the index server 116.

In more detail, in the example implementation of FIG. 1, the pricing calculation flow analyzer 132 may be configured to analyze a selected pricing schema and identify specific groupings and subgroupings of various price components therein, along with a specification of which of these groupings or subgroupings should be calculated in parallel, and which should be calculated in series. In the example implementations, the resulting logic flows may be represented in a language-independent format, and the parallel calculation flow program generator 122 may be responsible for translating the resulting logic flows into one or more language-specific runtime artifacts for storage as the parallel calculation procedures 134 within the process repository 130. For example, as described in detail below, the resulting runtime artifacts may include structured query language (SQL) script procedures, or L Language (L LANG) procedures. In example implementations, the resulting runtime artifacts may include procedures that are specific to the platform being used, such as the L LANG procedure used in the context of the SAP HANA in-memory computing platform. Thus, it will be appreciated that any suitable or appropriate programming language may be selected, based on availability of support for a given language provided by a particular platform.

Thus, as a result of the just-described operations of the design time tools 112, the runtime tools 114 may be provided with the benefit of the previously-constructed parallel calculation procedures 134, for use in dynamically calculating currently-requested prices in a fast and efficient manner. Specifically, in the example implementation of FIG. 1, the runtime tools 114 may include a price calculation engine 136, which may be configured to interact with a price calculator 138 implemented in the context of the in-memory computing engine 102. Then, when a request handler 140 of the price calculation engine 136 receives a pricing request, e.g., by way of the parallel price calculation flow generator UI 110, the request handler 140 may pass the received request to the price calculator 138. As described in more detail below, the price calculator 138 may proceed to utilize an appropriate procedure of the parallel calculation procedures 134, to thereby calculate the requested price, which may then be passed to a result provider 132 of the price calculation engine 136. In this way, the result provider 142 may provide desired prices, e.g., in a report or other suitable format, to the administrator or other user 108, by way of the parallel price calculation flow generator UI 110.

More detailed discussion of the price calculation engine 136 and the price calculator 138 is provided below, e.g., with respect to FIG. 2. However, for purposes of discussion of the example implementation of FIG. 1, and as illustrated therein, the price calculator 138 may include a record reader 134 that is configured to read master data records related to a requested price calculation. For example, such master data records may include information related to, or including, the corresponding pricing schema of the pricing schemas 120. Thus, it may be appreciated that such master data records may be stored, at least in part, using the data store 118 although some of the master data records might be stored in a different context within the in-memory computing engine 102, or may be outside of a storage context of the in-memory computing engine 102.

Meanwhile, a parallel price calculator 146 may be configured to execute relevant portions of a retrieved parallel calculation procedure, and thereby calculate appropriate groups or subgroups of pricing components in parallel, e.g., using available parallel processing cores of the in-memory computing engine 102. Subsequently, a result value generator 148 may be configured to combine the resulting parallel price calculations, including, potentially, subsequent sequential price calculations included within the appropriate parallel calculation procedure of the parallel calculation procedures 134, to thereby arrive at a final, aggregate price component. The result value generator 148 may then provide the resulting price component, perhaps in conjunction with other price components to thereby obtain a final price, for provision thereof to the administrator 108 by way of the result provider 142.

Thus, as described, the example implementation of the system 100 of FIG. 1 illustrates techniques deriving independent calculation flows from a corresponding pricing schema, for conversion thereof into runtime artifacts, as part of a design time activity of the design time tools 112. Then, the resulting runtime artifacts may be executed in parallel during runtime (e.g., during price calculations and business transactions) by the runtime tools 114.

As also described, the parallel calculation flow program generator 122 examines pricing schemas and utilizes the pricing calculation flow analyzer 132 to derive appropriate, multiple calculation flows, which are designed to be executable in parallel to process independent columns/attributes of a given set of price components. In so doing, the parallel calculation flow program generator 122 attempts to separate sequential processing steps, for processing thereof at the end of the included parallel processes, so that all prerequisite values of the sequential processing flows are derived in the context of the generated parallel processing flows. Then, the resulting runtime artifacts or components may be invoked by the runtime tools 114, and processed within the in-memory computing engine 102 in order to calculate prices in a dynamic, fast, and efficient manner during runtime.

Figure 2:
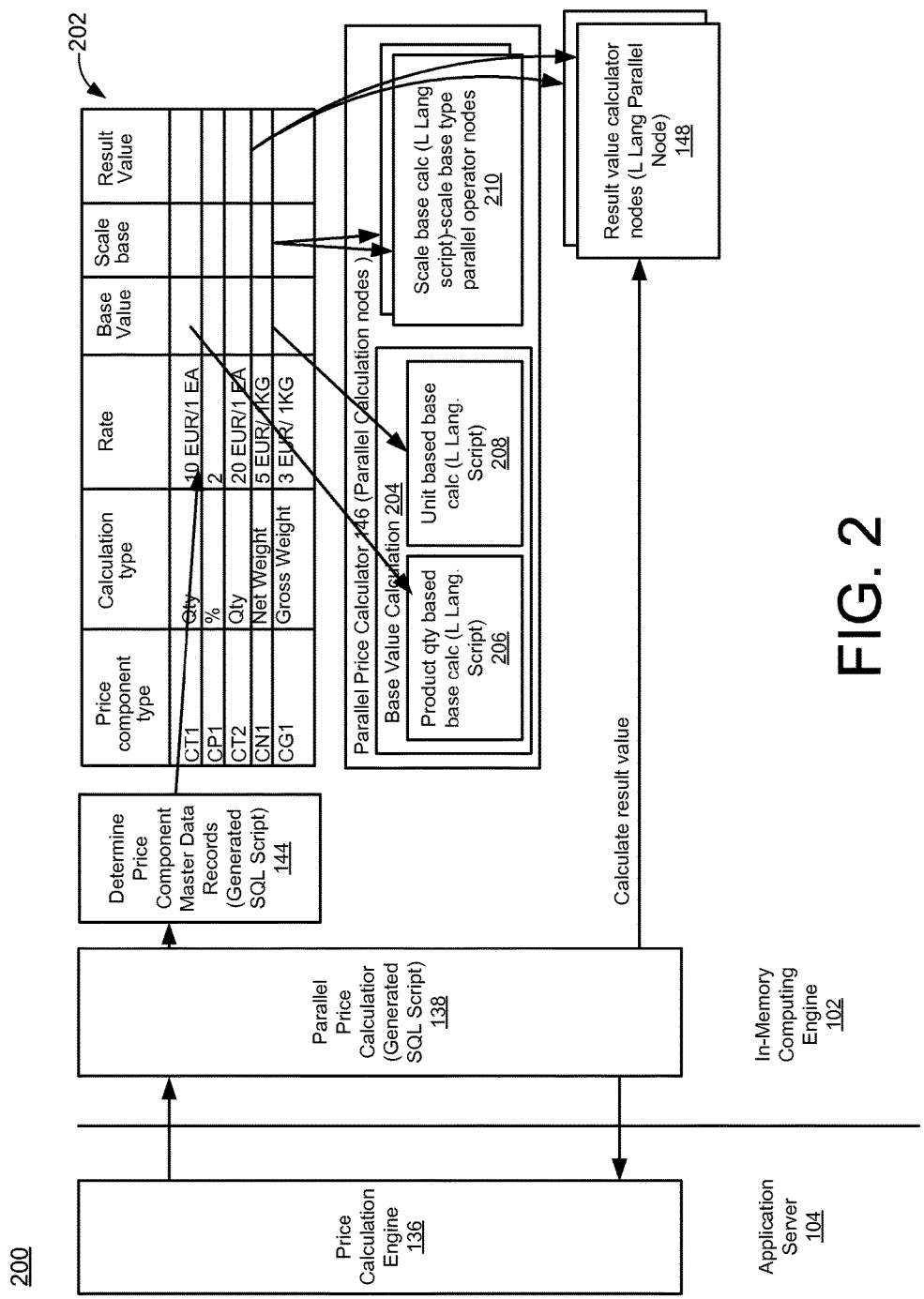
FIG. 2 is a block diagram illustrating a data flow of an example implementation of the system of FIG. 1.

In order to explain these concepts and related concepts in more detail, FIG. 2 illustrates a block diagram of a more specific example implementation of a runtime environment of the system 100 of FIG. 1. For purposes of FIG. 2, a simplified, example price component is defined below:

Price component (rate, base value, scale base value, result value) Example Price Component The example price component is illustrated as including four subcomponents, i.e., an applicable rate, base value, scale base value, and result value. That is, it should be appreciated from the above description that the price component illustrated above might represent one of a number of price components included within a particular pricing schema associated with a particular item or class of items. For example, the illustrated price component might represent a price, discount, surcharge, tax or any other aspect used within a corresponding pricing schema to determine a current price.

In the example price component provided, the rate may represent a value to be obtained from an appropriate data store. For example, as referenced above, the rate may be obtained from corresponding master data records used to store inventory and pricing information for specific items or types of items.

Meanwhile, the base value subcomponent refers to one or more factors on which the price will be calculated, such as, for example, a weight, volume, or count of an item in question. The scale base value may refer to a discount, such as a volume or quantity discount, that applies. Thus, some such values may be value-independent, such as the values referenced above which rely on a quantity, weight, or volume of a relevant item. In contrast, some values may be value-dependent, such as a scale base value that is calculated as a percentage, e.g., a percentage discount.

Meanwhile, the result value referenced within the example price component may be understood to represent a result of calculated base values and scale base values, determined in conjunction with the corresponding rate, and for the specific price component. Then, as also referenced, a number of such price component result values may be aggregated or otherwise combined, in accordance with a corresponding pricing schema, to obtain a final price for an item or class of item in question.

FIG. 2 illustrates the above example price component format in table form, in a table 202. As shown, the table 202 includes columns specifying a price component type, a calculation type, a rate, a base value, a scale base value, and a result value. As shown, the price component types column may include various types of price components, which, as just referenced, may be aggregated or otherwise combined to obtain a total or final price. Meanwhile, the calculation type column refers to a property of each price component that is a customizable property determining a manner in which the base value and scale base value of the corresponding price component should be calculated. For example, as referenced above and as shown in the table 202, the calculation type property may specify whether calculations should be made based on a quantity, percentage, net weight, gross weight, or other characteristic. As also referenced above, such calculation types may be value dependent (e.g., percentage) or may be value independent (e.g., quantity or weight).

Also illustrated in the table 202, the rate column includes a corresponding rate that is defined in terms of the appropriate calculation type for the corresponding price component. For example, for a calculation type of "quantity," the rate may include a number of euros, dollars, or other currency per each item for sale. Meanwhile, the rate for a calculation type of percentage may be expressed as an appropriate percentage. The rate value for calculation types based on weight may, as shown, be specified as a number of euros, dollars, or other currency per unit of (net or gross) weight.

In the example of FIG. 2, the system 200 is illustrated with respect to the example architecture already described above with respect to FIG. 1. That is, as shown, the application server 104 is illustrated as including the price calculation engine 136 of the runtime tools 114, and is shown as being separate from the in-memory computing engine 102. Then, within the in-memory computing engine 102, the parallel price calculator 138 is illustrated as being in communication with the record reader 144. Meanwhile, the parallel price calculator 146 is illustrated in detail with respect to operations performed on the table 202. Further, the result value generator 148 is also illustrated as obtaining result values from the corresponding column of the table 202, for provision thereof, by way of the parallel price calculator 138, to the price calculation engine 136 of the application server 104.

Thus, the system 200 of FIG. 2 may be understood in the context of the system 100 of FIG. 1, and with the benefit of the explanation and description provided above in conjunction therewith, but with additional example details provided in conjunction with the example price component provided above and in conjunction with the table 202 of FIG. 2. Specifically, the parallel price calculator 138 may be understood to obtain, from an appropriate parallel calculation procedure of the parallel calculation procedures 134, a generated SQL script previously-provided by the design time tools 112, and governing pricing procedures for a corresponding pricing scheme of the pricing schema 120. Then, record reader 144, which may also be implemented as a generated SQL script, may proceed to read price component master data records and thereby populate the rate column of the table 202. Then, the parallel price calculator 146 may proceed to execute similarly-generated L LANG scripts in the context of parallel calculation nodes illustrated in FIG. 2 as including base value calculations 204 and scale base value calculations 210. In other words, as shown, the base value column (attribute) and scale base column (attribute) illustrate examples of price components/attributes that may be calculated in parallel, for all value-independent price components. Thus, in the example, the base value column and the scale base column illustrate independent columns that may be calculated in parallel with one another.

Further in the example of FIG. 2, it may occur that subgroups of entries within each such column also may themselves be calculated in parallel. For example, a parallel calculation node 206 illustrates parallel calculation, using an appropriate L LANG script, for quantity based base value calculations, such as for the price component types CT1, CT2 of the table 202. Similarly, a parallel calculation node 208 within the base value calculation node 204 executes further parallel processing of unit based base value calculations, such as the weight-based calculations of the price component types CN1, CG1. In other words, as shown, further, smaller blocks of price subcomponents may be grouped based on corresponding calculation type properties for further parallel processing thereof.

Thus, FIG. 2 illustrates the parallelization of calculation of subcomponents of price components, in which value-independent price components are processed in parallel, including parallel processing of subgroupings of such subcomponents, after which value dependent subcomponents may be processed sequentially, in order to account for dependencies on previously-calculated subcomponent values. As shown in the example, all product quantity based price subcomponents may be grouped together, while physical unit based price components may be placed into a separate subgroup. Then, all such groups and subgroups may be provided to corresponding parallel processing units, for parallel processing thereof.

For example, the result value generator 148 may include corresponding result value calculator nodes, expressed as L LANG script procedures, for aggregating previously-calculated parallel pricing calculations, together with subsequent sequential processing of value dependent pricing subcomponents. In this way, final result values for the various price components may be provided to the parallel price calculator 138, and ultimately to the price calculation engine 136 of the application server 104.

Thus, FIG. 2 illustrates runtime components which invoke appropriate runtime objects for execution thereof within the in-memory computing engine 102, using available in-memory computing engine components (e.g., SQL script procedure processors, or L LANG runtime environments). As described, during runtime, parallel price calculation processes may begin once relevant master data records are read from the appropriate in-memory database, based on provided price-relevant attributes. Parallel price calculation may be conducted within an available in-memory computing engine that is closest to the in-memory store in which the master data records are residing. Calculation results of the parallel processing, i.e., merged results from the parallel calculation executions, may be handed over to the price calculation engine 136 running on the application server 104 for further processing, and for presentation to the administrator or other user 108.

As described, the systems 100, 200 of FIGS. 1 and 2, rather than being fully based on sequential processing (e.g., row by row or cell by cell processing logic), utilize parallel calculation flow paths between calculation-relevant attributes (columns), and those attributes (columns) are processed in parallel in order to boost a performance of related price calculations. As a result, a user experience of such price calculations may be improved, while a low total cost of ownership may be achieved due to the optimized usage of an available multi-core architecture of the in-memory computing engine 102.

Further, a total process complexity may be reduced, and essential key performance indicators (KPIs) may be achieved. Consequently, dynamic pricing may be achieved, such as in scenarios in which end users in web based retail environments are provided with current, dynamic, customized prices. In other example implementations, a detailed, updated price list may be dynamically generated for the benefit of a wholesaler, retailer, or other commercial transaction partner.

Figure 3:
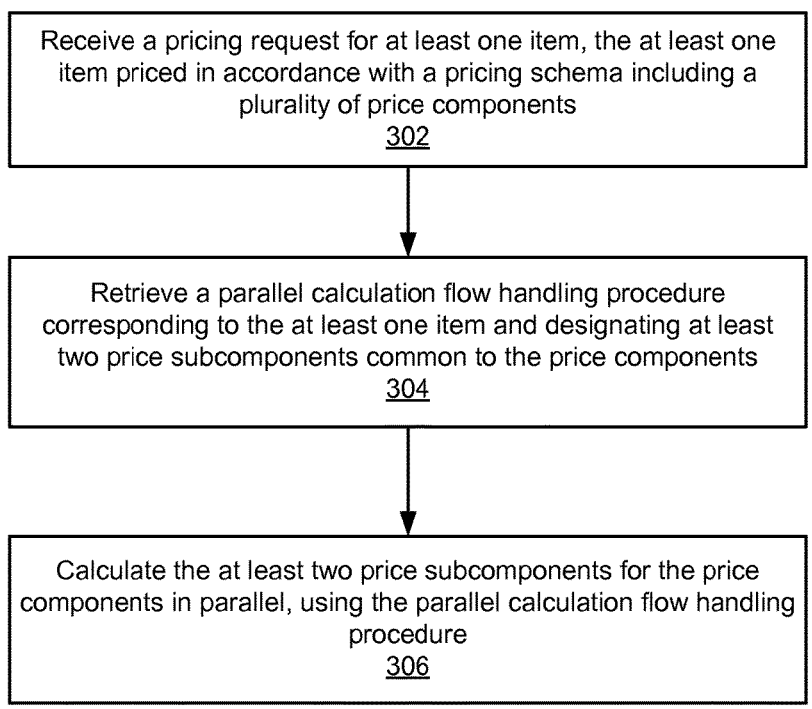
FIG. 3 is a flowchart illustrating example operations of the system of FIGS. 1 and 2.

FIG. 3 is a flowchart illustrating example operations of the systems 100, 200 of FIGS. 1 and 2. In the example of FIG. 3, operations 302, 304, 306 are illustrated as separate, sequential operations. However, in other example implementations, various additional or alternative operations may be included, and/or one or more operations may be omitted. Further, in all such implementations, the various operations may be executed in a parallel, iterative, nested, looped, or branched fashion.

In the example of FIG. 3, a pricing request for at least one item may be received, the at least one item priced in accordance with a pricing schema including a plurality of pricing components (302). For example, the price calculator 138 of the in-memory computing engine 102 may be configured to receive a pricing request, such as a pricing request received by way of the request handler 140 of the price calculation engine 136 of the application server 104. In this context, it may be appreciated that the at least one item may refer to a large plurality of items, where each such item, or appropriate groups of such items, are priced in accordance with corresponding pricing schemas 120.

A parallel calculation flow handling procedure corresponding to the at least one item and designating at least two price subcomponents common to the price components may be retrieved (304). For example, the parallel price calculator 146 of the price calculator 138 may be configured to retrieve one or more of the parallel calculation procedures 134 stored within the process repository 130. As described above, each price component specified within the corresponding pricing schema may include two or more price subcomponents. In the example provided above, the provided price component includes, for example, the two price subcomponents base value and scale base value, which are common to the various price components of the table 202 of FIG. 2.

The at least two price subcomponents may be calculated for the price components in parallel, using the parallel calculation flow handler procedure (306). For example, the parallel price calculator 146 may be configured to calculate the various values for the price subcomponents "base value," as well as for the price subcomponents "scale base value," using available parallel processing cores of the in-memory computing engine 102. By processing the base value subcomponents for corresponding price components in parallel with calculation of the scale base value subcomponents of the price components, the parallel price calculator 146 provides high speed price calculation.

As may be appreciated, the flowchart 300 of FIG. 3 provides a high level, simplified example process flow for the types of parallel price calculations described above in detail with respect to FIGS. 1 and 2. Consequently, as referenced above, it may be appreciated that various additional or alternative operations may be included in the flowchart 300 of FIG. 3. For example, as described with respect to FIG. 2, various subgroups within a particular group of price subcomponents may themselves be included together for further parallel processing thereof. Further, results of the various parallel processing procedures may ultimately be combined with subsequent sequential processing to obtain result values for the various price components, and ultimately to obtain a total price for the at least one item.

Figure 4:
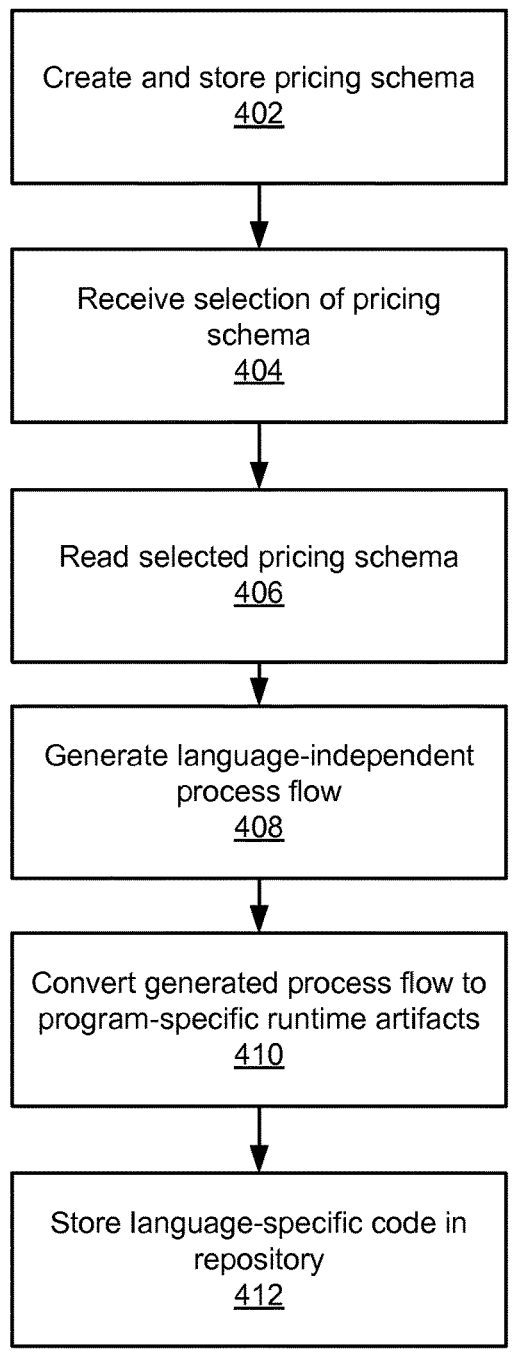
FIG. 4 is a flowchart illustrating more detailed example operations related to design time operations of the system of FIG. 1.

FIG. 4 is a more detailed example flowchart 400 describing operations of the design time tools 112 of the application server 104, in conjunction with operations and functions of the index server 116 of the in-memory computing engine 102. Specifically, in the example of FIG. 4, it may be appreciated that the administrator 108 seeks to construct the parallel calculation procedures 134 for a plurality of items and associated pricing schemas. Then, the resulting parallel calculation procedures 134 may be utilized by the runtime tools 114 and the price calculator 138 to execute included parallel pricing calculations, as referenced above and described in detail below with respect to FIG. 5.

Thus, in the example of FIG. 4, a design time process may begin with a creation and storage of a pricing schema for a corresponding item or type of item, or for a plurality of items that are each associated with the same pricing schema (402). For example, the administrator 108 or other user may provide the application server 104 with an appropriate or desired pricing schema, which may then be stored as the pricing schema 120 within the data store 118 of the index server 116 of the in-memory computing engine 102.

Then, when the administrator 108 wishes to begin construction of the parallel calculation procedures 134 in conjunction with the thus-stored pricing schemas, the design time tools 112 may receive a selection of a pricing schema (404) from the administrator 108, for construction of corresponding parallel calculation procedures 134. For example, the administrator 108 may specify a pricing schema of the pricing schemas 120.

Then, the appropriate, corresponding pricing schema may be read from the pricing schemas 120, e.g., through use of the pricing schema reader 124 (406). After instructing such access to the pricing schemas 120 by way of the pricing schema reader 124, the parallel calculation flow program generator 122 may delegate a generation of a language-independent logic flow to the pricing calculation flow analyzer 132 (408). That is, as described, the pricing calculation flow analyzer 132 may be configured to construct a generic logic flow which matches constraints and requirements of the corresponding pricing schema for the selected pricing schema, and which identifies which attributes (columns) of the price component(s) should be calculated in parallel, and which price subcomponents of a given price component should be including in corresponding subgroups for further parallel processing thereof, as well as which (and how) remaining subcomponents should be calculated serially to get a final result value.

Then, the parallel calculation flow program generator 122 may be configured to convert the generated process flow into a program-specific runtime artifact or artifacts (410). For example, as described, the parallel calculation flow program generator 122 may be configured to generate SQL scripts and/or L LANG procedures that are designed to execute, during a later runtime, appropriate parallel pricing calculations, and related operations, for the item in question.

Finally, in the example of FIG. 4, the resulting language-specific code may be stored within a repository of the in-memory computing engine 102 (412). For example, as shown, the parallel calculation flow program generator 122 may cause the repository accessor 126 to interface with the repository interface 128 of the index server 116, to thereby store the parallel calculation procedures 134 within the process repository 130 of the index server 116. As a result of these design time operations, the parallel calculation procedures 134 may be made available to, and may be stored within, the process repository 130, so as to thereby be immediately available for use during runtime parallel pricing calculations.

Figure 5:
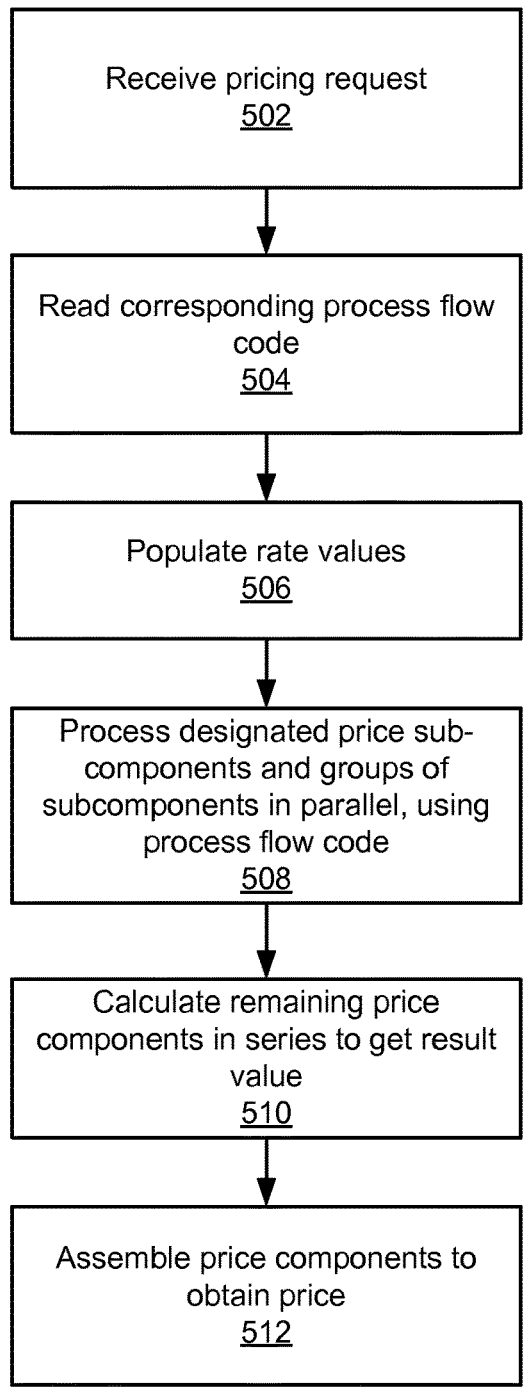
FIG. 5 is a flowchart illustrating more detailed example operations of a runtime of the system of FIG. 1.

FIG. 5 is a flowchart 500 illustrating more detailed example operations of the runtime tools 114 of the application server 104 in conjunction with the price calculator 138 of the in-memory computing engine 102. In the example of FIG. 5, a pricing request is received (502). For example, the request handler 140 of the price calculation engine 136 may receive a pricing request from the administrator or other user 108, e.g., by way of the parallel price calculation flow generator UI 110. The price calculator 138 of the in-memory computing engine 102 may thus receive the pricing request from the request handler 140.

The price calculator 138 may thus proceed to identify and read the corresponding process flow code, i.e., the corresponding parallel calculation procedure 134, from the process repository 130 (504). Then, the record reader 144 of the price calculator 138 may proceed to retrieve corresponding master data records, for, e.g., population of rate values within the rate column of the table 202 of FIG. 2 (506).

The parallel price calculator 146 may thus proceed to process designated price subcomponents, and groups of subcomponents, in parallel, using the retrieved process flow code (508). For example, as described above with respect to FIG. 2, the parallel price calculator 146 may calculate the base value column of the table 202 in parallel with calculations of the scale base value column of the table 202. At the same time, within each such parallel pricing procedure, further parallelization of included subgroups within each column may also be executed (e.g., the base value column values which are determined based on count may be one subgroup, while base value column values determined according to weight may form another subgroup to be calculated in parallel with the first subgroup).

Remaining price components may be calculated in series to obtain a result value for a particular price component (510). For example, the result value generator 148 may be configured to assemble the calculated base value subcomponents and scale base value subcomponents to obtain result values from inclusion within the result value column of the table 202 of FIG. 2. Such calculations may include serial processing of any value-dependent values, such as, e.g., price subcomponents that are calculated as a percentage of a previously-calculated price subcomponent.

Finally in the example of FIG. 5, the thus-computed price components may be assembled to obtain a total price for the item or items of the original pricing requests (512). For example, the price calculator 138 may be configured to aggregate or otherwise assemble various price components associated with a particular item or type of items, or in additional or alternative implementations, the price calculation engine 136 of the application server 104 may be configured to assemble a total price from relevant, corresponding price components.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
an in-memory computing engine having at least two processing cores of at least one processor;

an application server coupled to the in-memory computing engine, the application server including
a pricing schema reader configured to read a plurality of pricing schemas from the in-memory computing engine to obtain a pricing schema therefrom, the pricing schema including a plurality of price components and corresponding to at least one item;
a pricing calculation flow analyzer configured to analyze the pricing schema to sort the plurality of price components to obtain one or more parallel calculation procedures and one or more sequential calculation procedures for executing the plurality of price components, expressed as a language-independent process flow;
a parallel calculation flow program generator configured to convert the language-independent process flow into executable, language-specific runtime artifacts;
a repository accessor configured to store the runtime artifacts within at least one parallel calculation flow handling procedure stored using a repository of the in-memory computing engine, wherein the in-memory computing engine includes
a price calculator configured to cause the at least one processor to receive a pricing request for the at least one item, the price calculator including
a record reader configured to cause the at least one processor to retrieve master data records corresponding to the at least one item from a data store of the in-memory computing engine;
a parallel price calculator configured to cause the at least one processor to retrieve the at least one parallel calculation flow handling procedure corresponding to the at least one item and designating at least two price subcomponents common to the price components, and further configured to cause the at least one processor to calculate the at least two price subcomponents for the price components in parallel, using the parallel calculation flow handling procedure and the retrieved master data records, to thereby satisfy the pricing request for the at least one item,
wherein each occurrence of the at least two price subcomponents of the plurality of price components is calculated in conjunction with a corresponding calculation type and rate value, and wherein the parallel price calculator is further configured to cause the at least one processor to:
identify, within one of the at least two price subcomponents, at least two subgroupings having a common calculation type, and
calculate the at least two subgroupings in parallel.

2. The system of claim 1, wherein the in-memory computing engine is further configured to store the parallel calculation flow handling procedure among a plurality of parallel flow handling procedures corresponding to the plurality of pricing schemas and pre-calculated using the parallel calculation flow program generator of the application server.

3. The system of claim 2, wherein the plurality of price components are represented in a table within the in-memory computing engine, and wherein each price subcomponent is a column of the table.

4. The system of claim 1, wherein the record reader is further configured to cause the at least one processor to read rate values from the master data records that include the at least one item, the rate values being included within each of the plurality of price components and determinative of at least one rate at which at least one price subcomponent is calculated.

5. The system of claim 1, wherein the plurality of price components include value-independent price components, and additional price components are value-dependent, and further wherein the price calculator further includes a result value generator that is configured to cause the at least one processor to calculate the value-dependent values of each of the at least two price subcomponents in series with the price subcomponents calculated in parallel to obtain a result value for each price component of the plurality of price components.

6. The system of claim 1, wherein the price calculator is further configured to combine multiple calculated price components associated with a single item, and thereby provide a total price for that item.

7. A computer-implemented method for executing instructions stored on a non-transitory computer readable storage medium, the method comprising:
constructing, using design time tools of an application server, a parallel calculation flow handling procedure corresponding to at least one item priced in accordance with a pricing schema, the pricing schema specifying a plurality of price components, wherein the parallel calculation flow handling procedure calculates at least two price subcomponents common to the price components in parallel;
storing the parallel calculation flow handling procedure in a process repository of an in-memory computing engine;
selecting, using runtime tools of the application server and in response to a pricing request for the at least one item, the parallel calculation flow handling procedure; and
instructing the in-memory computing engine to calculate the plurality of price components using the parallel calculation flow handling procedure, including the calculating of the at least two price subcomponents common to the price components in parallel, using at least two processing cores of the in-memory computing engine,
wherein the constructing includes:
reading, using a pricing schema reader of the design time tools, the pricing schema from a datastore of the in-memory computing engine;
constructing, using a pricing calculation flow analyzer of the design time tools, a language-independent logic flow specifying the at least two price subcomponents to be calculated in parallel; and
generating, using a parallel calculation flow program generator of the design time tools, the parallel calculation flow handling procedure in language-specific form using at least one language executable by the in-memory computing engine.

8. The method of claim 7, further comprising providing, using the runtime tools, a result value derived from the calculating of the plurality of price components to a parallel price calculation flow generator user interface (UI).

9. The method of claim 7, wherein the plurality of price components include value-independent price components, and additional price components are value-dependent, and further wherein the parallel calculation procedure specifies calculation of the value-dependent values of each of the at least two price subcomponents in series with the price subcomponents calculated in parallel to obtain a result value for each price component of the plurality of price components.

10. The method of claim 7, wherein each occurrence of the at least two price subcomponents of the plurality of price components is calculated in conjunction with a corresponding calculation type and rate value, and wherein the parallel calculation procedure identifies, within one of the at least two price subcomponents, at least two subgroupings having a common calculation type, and calculates the at least two subgroupings in parallel.

11. A computer program product, the computer program product being tangibly embodied on a non-transitory computer-readable storage medium and comprising instructions that, when executed, are configured to cause at least one computing device to:
construct a language-independent logic flow specifying at least two price subcomponents of a price component of a pricing schema to be calculated in parallel;
convert the language-independent logic flow into language-specific runtime code executable by an in-memory computing engine, to thereby obtain a parallel calculation flow handling procedure;
receive a pricing request for at least one item, the at least one item priced in accordance with the pricing schema including a plurality of price components, including the price component;
retrieve the parallel calculation flow handling procedure corresponding to the at least one item and designating the at least two price subcomponents common to the plurality of price components; and
calculate the at least two price subcomponents for the plurality of price components in parallel, using the parallel calculation flow handling procedure, wherein
the instructions are executed within an in-memory computing engine, and the at least one computing device includes at least two processing cores of the in-memory computing engine, and further wherein the in-memory computing engine is configured to store the pricing schema within a plurality of pricing schemas, and further configured to store the parallel calculation flow handling procedure among a plurality of parallel flow handling procedures corresponding to the plurality of pricing schemas and pre-calculated using a parallel calculation flow program generator of an application server.

12. The computer program product of claim 11, wherein the instructions, when executed, are further configured to cause the at least one computing device to:
read rate values from master data records that include the at least one item, the rate values being included within each of the plurality of price components and determinative of at least one rate at which at least one price subcomponent is calculated.

13. The computer program product of claim 11, wherein each occurrence of the at least two price subcomponents of the plurality of price components is calculated in conjunction with a corresponding calculation type and rate value, and wherein the instructions, when executed, are further configured to cause the at least one computing device to
identify, within one of the at least two price subcomponents, at least two subgroupings having a common calculation type, and
calculate the at least two subgroupings in parallel.

14. The computer program product of claim 11, wherein the plurality of price components include value-independent price components, and additional price components are value-dependent, and wherein the instructions, when executed, are further configured to cause the at least one computing device to:
calculate the value-dependent values of each of the at least two price subcomponents in series with the price subcomponents calculated in parallel to obtain a result value for each price component of the plurality of price components.

* * * * *